July 1, 1924.

W. SCHOENENBERG

DEVICE FOR TYPEWRITING MACHINES FOR FEEDING,
CUTTING OFF, AND REMOVING FORMS

Filed Feb. 13, 1922     4 Sheets-Sheet 1

INVENTOR
Wilhelm Schoenenberg,
by
Attorneys.

INVENTOR
Wilhelm Schoenenberg
by Richards Greer
Attorneys.

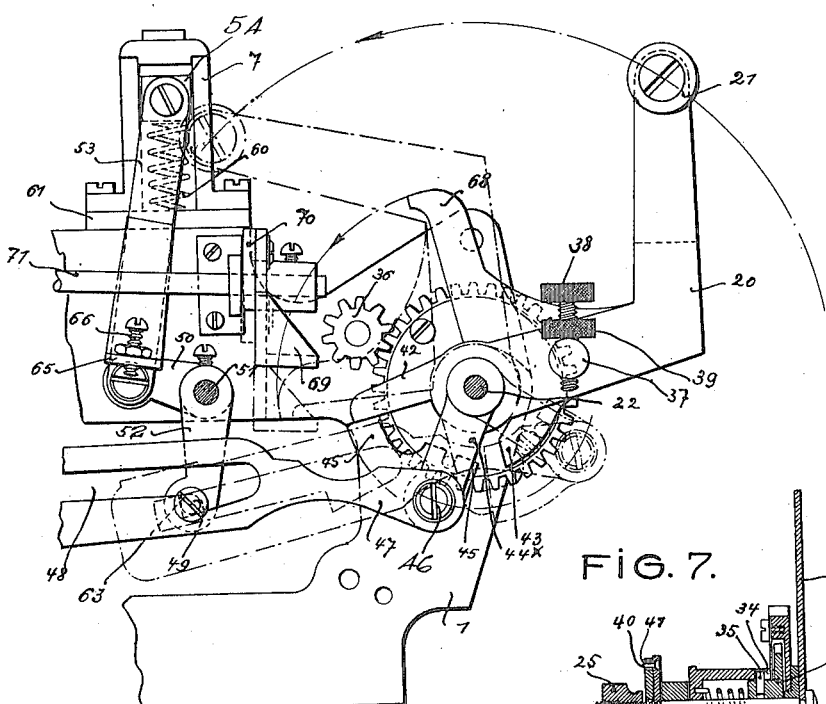
FIG. 5.
FIG. 7.
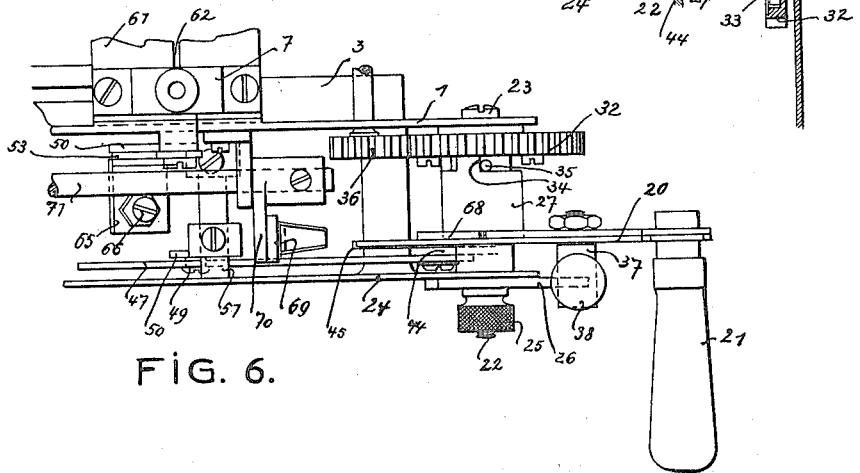
FIG. 6.
INVENTOR
Wilhelm Schoenenberg
by
Richard [illegible]
Attorneys.

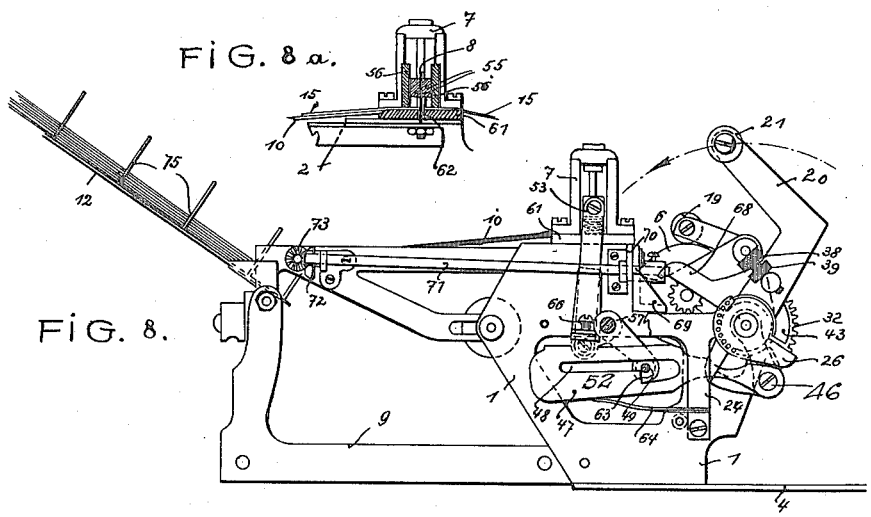
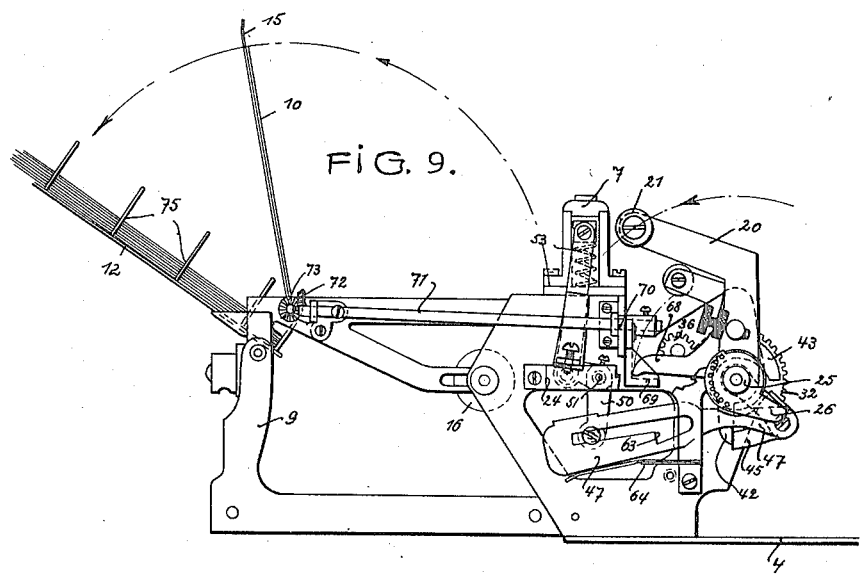

Patented July 1, 1924.

1,499,410

UNITED STATES PATENT OFFICE.

WILHELM SCHOENENBERG, OF COLOGNE-DEUTZ, GERMANY.

DEVICE FOR TYPEWRITING MACHINES FOR FEEDING, CUTTING OFF, AND REMOVING FORMS.

Application filed February 13, 1922. Serial No. 536,048.

*To all whom it may concern:*

Be it known that I, WILHELM SCHOENENBERG, of Cologne-Deutz, Germany, a citizen of the German Republic, have invented certain new and useful Improvements in Devices for Typewriting Machines for Feeding, Cutting Off, and Removing Forms, of which the following is a specification.

The present invention relates to such devices for use in combination with typewriting machines adapted for the purpose of advancing a paper band, on which have been printed in suitable lengths successive account forms or the like, with or without book-keeping sheets adapted to be fed forward by lines, through the length of a complete account at each operation, to cut the forms from the end of the band and to place them on a collecting stack. In such feed devices, which as usual are mounted on the carriage of a suitable typewriting machine, it is known on the one hand to form the device serving to turn a feed roller through the length of the form, on the other hand the cutting device, and to connect them to a common hand lever in such a manner that by the movement of this hand lever in one direction, the feed device, and in the opposite direction the cutting device is brought into operation, whilst for removing the forms cut off at any time a device operated by a separate handle is provided.

The present invention has for its object to form the operating mechanism of devices for operating upon forms on book-keeping typewriting machines and the like, in such a manner that the removing device may be also operated by the same hand lever which serves for effecting the feed and the cutting off and this directly after the movement of this lever serving to effect the cutting off has been completed. In this manner a considerable simplification and acceleration of the operation of the device is attained.

Fig. 5 shows in detail to a larger scale, an elevation from the left side of the machine, of the parts serving to operate the device.

Fig. 6 is a corresponding partial plan.

Fig. 7 shows a detail of the bearing for the operating lever.

Fig. 8 shows a side elevation corresponding to Fig. 3 of the device in the cutting off position, Fig. 8ª is a transverse section of one end of a knife and its strengthening supports and clamp rods connected therewith, the block guiding the ends of the knife being shown in side elevation, and Fig. 9 is a similar view in the removing position.

Figure 1:
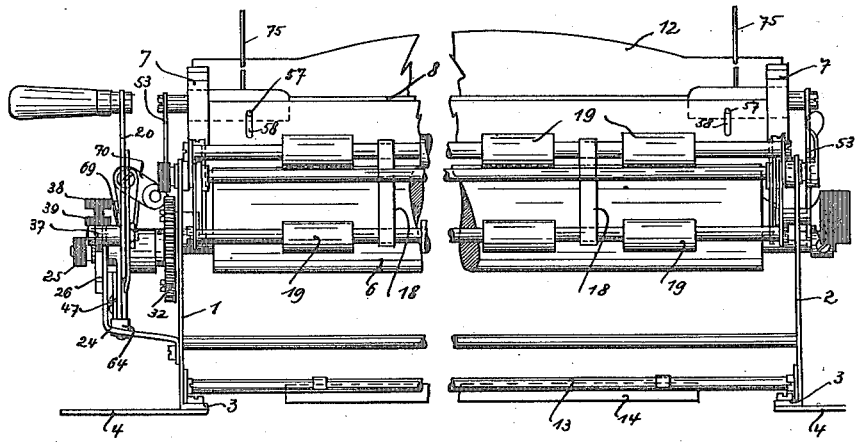
Fig. 1 shows a front elevation of the device.
Figure 2:
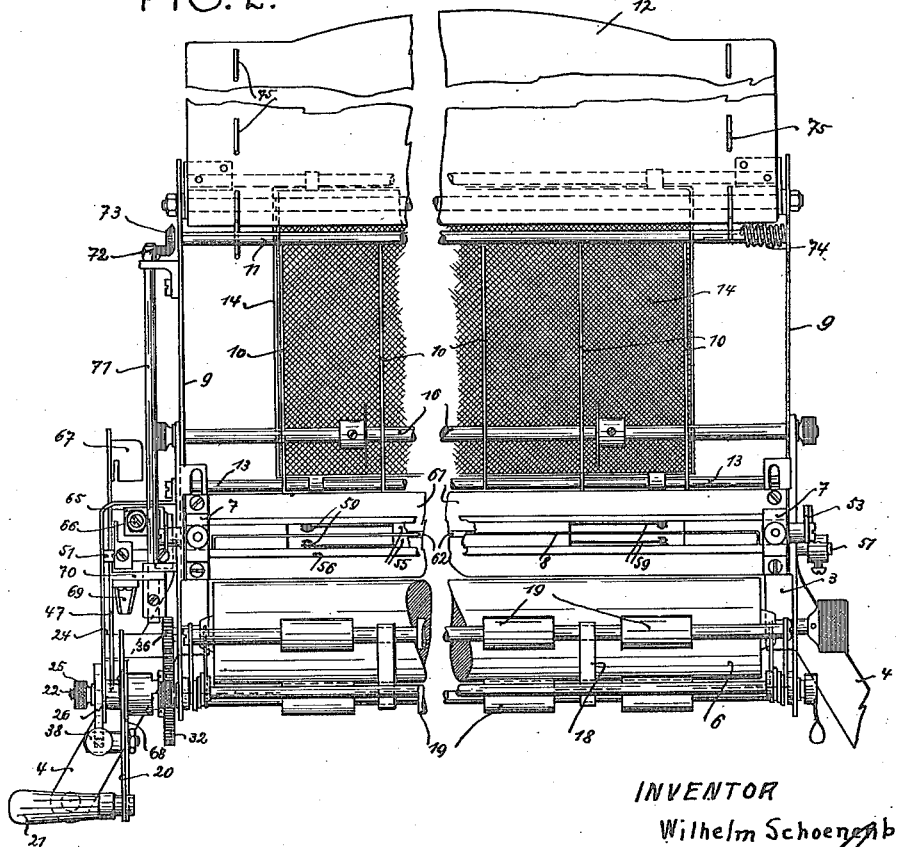
Fig. 2 is a corresponding plan.
Figure 3:
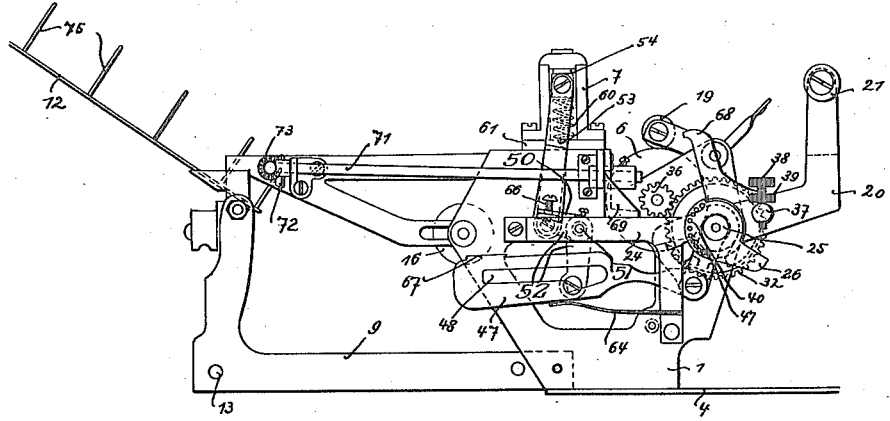
Fig. 3 is a view from the left side.
Figure 4:
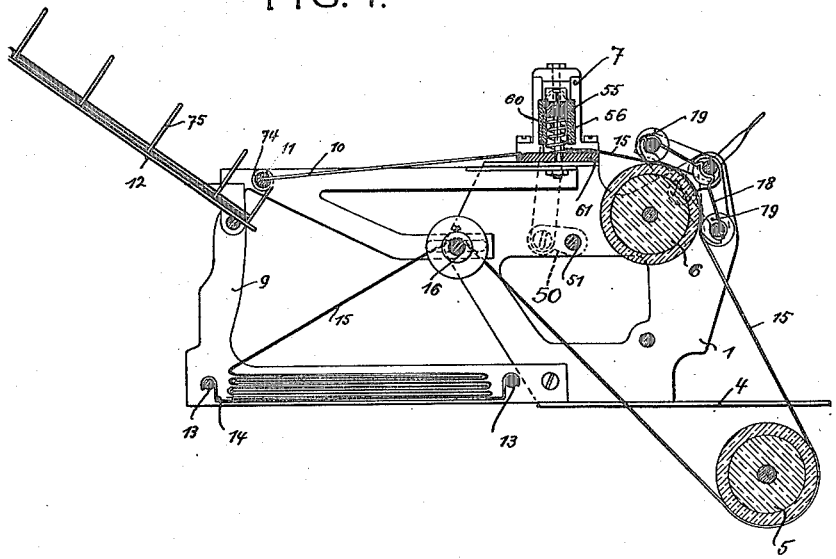
Fig. 4 is a longitudinal section of the device.

The principal parts of the frame of the device are formed by the two vertical frame cheeks 1 and 2, which at their lower ends are provided with inwardly turned angle irons 3, for securing purposes, by means of which they are mounted on the end cheeks of the carriage of the typewriting machine, and may be connected to these end cheeks at suitable positions by means, for example, of the rotatable sheet metal ties 4. This connection to the carriage of the typewriting machine is shown in the sectional view Fig. 4 in which the position of the platen 5 is also indicated.

The two side cheeks are connected together by suitable transverse rods and near the front end carry the bearings of the feed roller 6, further rearwards the cutting off device is disposed on the top of these frame parts, the cutting off device consisting, for example, of a knife 8 provided with a racked cutter and guided at both ends in small blocks 7. These frame cheeks are provided with a rearward extension 9 near the rear end of which is rotatably mounted a transverse shaft 11 provided with a series of rake rods 10 which are normally directed forwards. Behind these, the frame extension cheeks 9 carry the receiving plate 12 for the cut up form sheets which are collected by the rakes, and underneath there is suspended from two transverse pins 13 a supply basket 14 for the form band 15 which is folded according to the Leprollo method in book or feed form. The latter is first guided downwards over a guide roller 16 around the platen 5 of the typewriting machine and then around the front and top side of the feed roller 6 between this and the rubber rollers 19 pressed against the feed roller by springs 18. From here the end of the form band passes through the cutting device under the knife and is placed from the top on the forwardly directed rods 10 of the rake.

The hand lever 20, which is preferably provided with a lateral handle 21, for the operation of the device, is carried by a bearing shaft 22 which at one end is held in the left hand frame cheek 1 of the device, for example, by means of a slotted screw 23, whilst the other outwardly projecting end bears against an outer cheek 24 against which it is held at the same time as an abutment arm 26 by a set screw 25. The hub 27 of the hand lever engages by means of a recess provided on the inner end thereof and containing a return spring 28, as is clearly seen in Fig. 7 over the hub 29 of a ratchet wheel 30, which in addition to the pawl 31 engaging therewith, is mounted in a recess provided in a toothed wheel 32 also mounted on the pivot 22, the recess on the side turned towards the hollow hub 27 being closed by a plate 33. At the edge this is provided with a claw or projection 34, which lies in the path of a pin 35 radially inserted in the hub 29. The two ends of the return spring 28 engage with the oppositely disposed surfaces of the hubs 27 and 29 by means of right angled bends and the preliminary tensioning of the spring is such that the claw 34 is normally pressed against the pin 35. By means of these parts a forward movement of the hand lever is transmitted to the ratchet wheel 30 and thus through the medium of the ratchet pawl 31 to the toothed wheel 32, it, however, permits the rearward movement of the hand lever by tensioning the spring without positively turning the toothed wheel 32.

The positive rotation of the toothed wheel is transmitted to toothed gear 36 which gears therewith and is mounted on the shaft of the feed roller 6. The length of the feed, which in consequence of this arrangement is transmitted to the form band 15 on the forward movement of the hand lever 20, may be suitably adjusted by limiting stops. The lever, for example, is provided on the outer side of the projection 37 with an abutment screw 38 which can be locked by the lock nut 39, and of which the end is in the path of the abutment arm 26 which is retained by the set screw 25 on the shaft 22 and a supporting pin 40 provided on the outer cheek 24, which pin is adapted to engage with a series of holes 41 formed in the hub of the abutment arm 26 so that the abutment can thus be adjusted.

The hand lever 20 carries two radial arms 42, 43 of which one is within reach of an abutment sector 45 supported by a swinging arm 44 rotatably mounted on the bearing pivot 22 on the inner side of the outer cheek. To the end pivot 46 of this sector 45 is rotatably secured a tie rod 47 which is guided substantially horizontally rearwards and is provided with a long slot 48 into which projects the lateral pin 49 of a lever 50 mounted on a square shaft 51 which at both ends is supported in the frame cheeks 1 and 2. On this square shaft are mounted two substantially horizontal arms 52 which are each hinged by a rail 53 to the guide slides 54 vertically movable at both ends of the knife 8 in the small guiding blocks 7. The knife is provided at both ends for strengthening purposes with supports 55 on both sides of which are provided clamp rods 56 which are movably connected to the strengthening supports of the knife by guide pins 57 movable in vertical slots 58 and in the upper position of rest of the knife have their lower edges projected downwards to such an extent by spring not shown, disposed in recesses in the supports 55, that the clamp rods project somewhat beyond the toothed cutter of the knife extending transversely across the width of the machine. In this upper position of rest the knife is held by two springs 60 which are provided in the small guide blocks 7. When cutting the paper band this is supported by a rail 61 disposed underneath the knife blocks and the knife, and passing transversely from one frame cheek to the other, this rail being provided with a long slot 62 for the reception of the knife during the cutting operation. Upon this supporting rail or the form band supported thereby bear the clamping rods 56 when the knife is moved downwards for cutting but before the cutter reaches the paper, the rods bearing on both sides of the band so as to hold it firmly during the cutting operation.

The long slot 48 of the tie rod 47 is provided on its lower edge with a recess which has a vertically projecting limiting surface 63 at a suitable position for the free end of the tie rod. The tie rod has its rear end pressed upwards by a flat spring 64 provided on the outer cheek 24 so that when the rod is moved backwards, the lateral pin of the lever 50, which is preferably provided with a roller, engages with the recess in the long slot and on the forward movement of the rod is drawn with this in the manner of a hook. In this manner the knife 8 with its clamping rods 56 is moved downwards through the medium of the transverse shaft 51, the arm 52 and the rails 53 and the paper of the form band is cut through. When the downward movement of the knife has proceeded to a sufficient extent a releasing screw 66, provided in an angular arm 65 on the left hand rail 53, strikes against an inwardly projecting plate 67 at the end of the tie rod, and presses the rod downwards against the action of the flat spring 64, until the surface 63 springs away from the lateral pin 49 of the lever 50, so that without stopping the further rearward movement of the rod, the knife thus released can be returned to its upper limiting position by the springs 60. The forward movement of the lifting rod above described is produced by the hand lever 20, in that this lever, continuing the forward movement hereinbefore described, which effects the advance of the form band through a form length, is moved beyond its middle rest position backwards. During this operation the feed roller remains stationary, as by reason of the ratchet pawl 31 and the ratchet wheel 30, the toothed wheel can only be turned in the direction of the feed roller. On the rearward movement of the hand lever this, as above described, moves with it the swinging arm 44 of the tie rod by means of its arm 42 and the abutment sector 45. If after the operation of the cutting device, as hereinbefore described, the rearward movement of the hand lever is continued, the second arm 68 of this hand lever engages with the gripping shoe 68 of a suspension rod 69, lying in its path. The rod 69 is rotatable on the end of a lever 70, which is mounted on the outer side of the left frame cheek 1 on a longitudinal shaft 71. At its rear end this carries a cone gear sector 72 which meshes with a bevel gear 73 mounted at the left hand end of the transverse shaft of the rake 11. A spring 74, disposed for example at the right hand end thereof normally holds this shaft and the rake connected therewith in the forwardly folded position, so that the forward ends of the rake rods 10 bear upon the inclined rear edge of the supporting rail 61 of the cutting device without forming a projection for the paper movement. The gripping shoe 68 is moved downwards by the arm 43, thus turning the longitudinal shaft 71, the turning movement being transmitted to the transverse shaft of the rake by the toothed sector 72 and the bevel gear 73 in such a manner that the rake carries out a sufficient angular movement rearwards in order to place the previously cut sheet of paper, resting on the rods of the rake on to the receiving plate 12. By means of suitable lateral abutment pins 75 provided on the lower edge and a suitable inclined rod of these receiving plates the removed sheets are placed one above the other in the form of a neat stack of paper.

I claim:—

1. A device for feeding, cutting and removing forms in typewriting machines comprising a platen, a feed roller, a cutting device, a hand lever, movable in one direction to turn said feed roller through the length of a form and in the opposite direction to actuate said cutting device, a removing rake operated after the cutting device and means for receiving forms removed by said rake, said rake being actuated by said handle near the end of its reverse movement.

2. A device for feeding, cutting and removing forms in typewriting machines comprising a platen, a vertically movable knife, a feed roller, for moving a paper strip around said platen and beneath said knife, a plurality of rake rods, a receptacle for forms, a hand lever for operating said feed roller and said knife and means whereby said hand lever at the conclusion of the cutting operation causes partial rotation of said rake rods to remove the severed form to said receptacle.

3. A device for feeding, cutting and removing forms in typewriting machines comprising a frame, a platen mounted in said frame, a vertically movable knife, a feed roller adapted to feed a paper strip beneath said knife, a hand lever, driving connections between said lever and said feed roller, operable in one direction, operating connections between said hand lever and said knife and operable in the opposite direction, a transverse spindle in said frame, rake rods mounted on said spindle and means operable by said hand lever for rotating said spindle.

4. A device for feeding, cutting and removing forms in typewriting machines comprising a frame, a platen mounted in said frame, a vertically movable knife, a feed roller adapted to feed a paper strip beneath said knife, a hand lever, a train of gears between said lever and feed roller, a one-way clutch interposed in said train of gears, a slotted arm forming part of operating connections between said lever and said knife, a hook formed in the slot of said arm, a knife actuating lever adapted to be engaged by said hook and released therefrom after the cutting operation, springs for restoring said knife to upper position, a plurality of rake rods adapted to receive a form cut from the paper strip and means actuated by said hand lever for partially rotating said rods.

5. A device for feeding, cutting and removing forms in typewriting machines comprising a frame, a platen, a vertically movable knife, a feed roller adapted to feed a paper strip beneath said knife, all mounted in said frame, a hand lever, driving connections between said lever and said feed roller operable in one direction of movement of said lever, an arm mounted coaxially with said hand lever, a tie rod having a slot therein with a lateral recess, a bell crank lever engaging said slot, a link connected to one end of said bell crank lever and to said knife, springs opposing depression of said knife, a plurality of rake rods adapted to receive a form cut from the paper strip and means actuated by said hand lever for partially rotating said rods.

6. A device for feeding, cutting and removing forms in typewriting machines comprising a frame, a platen, a vertically movable knife, a feed roller for a paper strip all mounted in said frame, a hand lever, a gear train between said lever and said feed roller, a one way clutch interposed in said gear train, an arm mounted coaxially with said hand lever, a tie rod having a slot therein with a lateral recess, a bell crank lever engaging said slot, a link connecting said bell crank lever to the knife operating mechanism, springs opposing depression of said knife, stops limiting the movement of said hand lever in either direction, a plurality of rake rods adapted to receive a form cut from the paper strip and means actuated by said hand lever for partially rotating said rods.

7. A device for feeding, cutting and removing forms in typewriting machines comprising a frame, a platen, a vertically movable knife, a feed roller for a paper strip all mounted in said frame, a hand lever, a gear train between said lever and said feed roller, a one way clutch interposed in said gear train, an arm mounted coaxially with said hand lever, a tie rod having a slot therein with a lateral recess, a bell crank lever engaging said slot, a link connecting said bell crank lever to the knife operating mechanism, springs opposing depression of said knife, stops limiting the movement of said hand lever in either direction, a transverse spindle in said frame, a plurality of rake rods mounted on said spindle, a receptacle mounted at the rear of said frame and means operable by said hand lever at the conclusion of the cutting operation to rotate said spindle and remove the severed form to said receptacle.

8. A device for feeding, cutting and removing forms in typewriting machines comprising a frame, a platen, a vertically movable knife, a feed roller for a paper strip all mounted in said frame, a hand lever, a gear train between said lever and said feed roller, a one way clutch interposed in said gear train, an arm mounted coaxially with said hand lever, a tie rod having a slot therein with a lateral recess, a bell crank lever engaging said slot, a link connecting said bell crank lever to the knife operating mechanism, springs opposing depression of said knife, stops limiting the movement of said hand lever in either direction, a transverse spindle in said frame, a plurality of rake rods mounted on said spindle, a receptacle mounted at the rear of said frame, a second arm mounted coaxially with said hand lever, a shaft extending rearwardly of said frame, driving connections between said shaft and said spindle, means carried by said shaft to be engaged by said second arm at the conclusion of the cutting operation to impart rotation to the spindle and remove the severed form to the receptacle.

9. A device for feeding, cutting and removing forms in typewriting machines comprising a frame, a platen, a vertically movable knife, a feed roller for a paper strip all mounted in said frame, a hand operating lever, a gear train between said lever and said feed roller, an arm mounted coaxially with said hand lever, a tie rod having a slot therein with a lateral recess, a hinged connection between said arm and said tie rod, a transverse shaft in said frame, bell crank levers mounted on said shaft, a lateral pin on one of said levers engaging said slot, links connecting said bell crank levers to the ends of the knife, a stop on one of said links adapted to engage said tie rod, a spring opposing depression of said tie rod, springs opposing depression of said knife, a plurality of rake rods adapted to receive a form cut from said paper strip and means actuated by said hand lever for partially rotating said rods.

10. A device for feeding, cutting and removing forms in typewriting machines comprising a frame, a platen, a vertically movable knife, a feed roller for a paper strip all mounted in said frame, a hand operating lever, a gear train between said lever and said feed roller, a one way clutch interposed in said gear train, an arm mounted coaxially with said hand lever, a tie rod having a slot therein with a lateral recess, a hinged connection between said arm and said tie rod, a transverse shaft in said frame, bell crank levers mounted on said shaft, a lateral pin on one of said levers engaging said slot, links connecting said bell crank levers to the ends of the knife, a stop on one of said links adapted to engage said tie rod, a spring opposing depression of said tie rod, springs opposing depression of said knife, stops limiting the movement of said hand lever in either direction, a transverse spindle in said frame, a plurality of rake rods mounted on said spindle, a receptacle mounted at the rear of said frame, a second arm mounted coaxially with said hand lever, a shaft extending rearwardly of said frame, driving connections between said shaft and said spindle, means carried by said shaft to be engaged by said second arm at the conclusion of the cutting operation to impart rotation to the spindle and transfer the severed form to the receptacle.

11. A device for feeding, cutting and removing forms in typewriting machines comprising a platen, a feed roller, a cutting device, a hand lever movable in one direction to turn said feed roller through the length of a form and in the opposite direction to actuate said cutting device, a plurality of rake rods mounted at the rear of said cutting device, a receptacle mounted at the rear of said rake rods, a spindle carrying said rake rods, a shaft geared to said spindle, and means carried by said shaft to engage a stop on the hand lever at the conclusion of the cutting operation to impart partial rotation to said rake rods.

In witness whereof I affix my signature.

WILHELM SCHOENENBERG.